United States Patent [19]

Yamayoshi et al.

[11] Patent Number: 4,739,458
[45] Date of Patent: Apr. 19, 1988

[54] VEHICLE LAMP DEVICE

[75] Inventors: Takeshi Yamayoshi, Tokyo; Takeo Ichihara, Hatano, both of Japan

[73] Assignee: Stanley Electric Co., Ltd., Tokyo, Japan

[21] Appl. No.: 39,661

[22] Filed: Apr. 17, 1987

[30] Foreign Application Priority Data

Apr. 24, 1986 [JP] Japan .............................. 61-62200[U]

[51] Int. Cl.⁴ .......................... F21Q 1/00; F21V 25/00
[52] U.S. Cl. ...................................... 362/294; 362/345
[58] Field of Search ......................... 362/294, 345, 373

[56] References Cited

U.S. PATENT DOCUMENTS

| 4,015,114 | 3/1977 | Paajanen et al. | 362/294 |
| 4,405,974 | 9/1983 | Quiogue | 362/294 X |
| 4,580,203 | 4/1986 | Betsch et al. | 362/294 |
| 4,612,607 | 9/1986 | Segoshi et al. | 362/345 X |
| 4,635,173 | 1/1987 | Dressler et al. | 362/294 |

FOREIGN PATENT DOCUMENTS

| 2346643 | 3/1975 | Fed. Rep. of Germany | 362/373 |
| 2116693 | 9/1983 | United Kingdom | 362/294 |

Primary Examiner—Tony M. Argenbright
Attorney, Agent, or Firm—Frishauf, Holtz, Goodman & Woodward

[57] ABSTRACT

A vehicle lamp device comprises one thin board-like substrate having an aperture for communicating air from inside the lamp device to the outside of the lamp device, and another thin board-like substrate having a port for air communication. The two substrates are closely adjacent each other and define an air passage therebetween. The air passage is filled with desiccants and communicates air with the interior of the lamp device. The two substrates are located and mounted within the range of receiving sufficient heat from a bulb mounted to a resin reflector.

15 Claims, 2 Drawing Sheets

VEHICLE LAMP DEVICE

BACKGROUND OF THE INVENTION

The present invention relates to a vehicle lamp device provided with a reflector made of resin used for a headlamp or the like.

For a vehicle lamp device e.g. a headlamp, a reflector made of resin and a lens made of glass are often used in consideration of lightening the device. Further, desiccants are arranged at the lower portion of the hood to prevent making the interior of the lamp device vaporous. One example of the above mentioned known device is shown in FIG. 5. In FIG. 5 reference numeral 1 designates a bulb, 2 a reflector made of resin which also serves as a housing, 3 a lens, 4 a hood, and 5 desiccants.

In the arrangement of FIG. 5, if the whole lamp device is made of resin, the following deficiencies will be encountered;

(1) possibility of deformation of the lens and the reflector due to internal pressure caused by high airtightness; and (2) if a hole is provided on the lamp device to reduce pressure, air will come in and out at the time of flashing of the bulb, and accordingly, in the case where air of high percentage of humidity comes into the device, water drops will be generated inside the device.

OBJECT OF THE INVENTION

The object of the present invention is to prevent occurrence of internal pressure and still provide a vehicle lamp device in which dehumidifying and weight reduction can be achieved.

SUMMARY OF THE INVENTION

A vehicle lamp device in accordance with the present invention, wherein a reflector which also serves as a housing is provided with a lens mounted on the front surface of said reflector and a bulb arranged inside said reflector, comprises one thin substrate member having an aperture for the air communicating with the outside of the lamp device, and another thin substrate member having a port for the air communicating with an air passage filled with desiccants and with the inside of the lamp device, the two substrate members being closely arranged adjacent to each other and being located and mounted within the range of receiving heat from said bulb.

DETAILED DESCRIPTION

Figure 1:
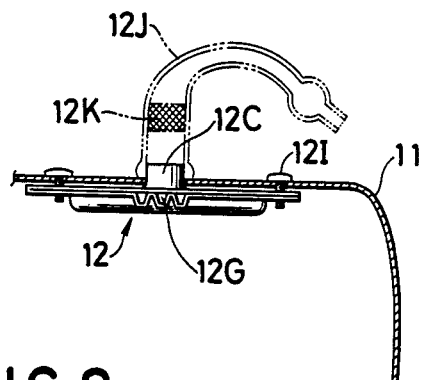
FIG. 1 is a sectional view showing an embodiment of a vehicle lamp device according to the present invention.
Figure 2:
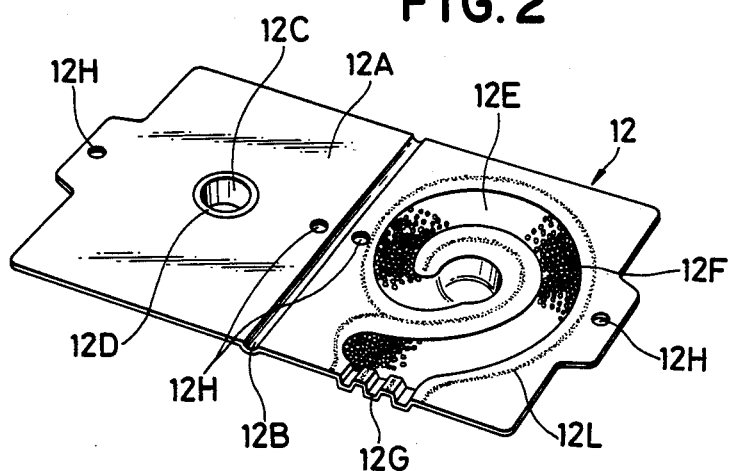
FIGS. 2 and 3 are perspective views showing a ventilating device of the embodiment in FIG. 1.
Figure 3:
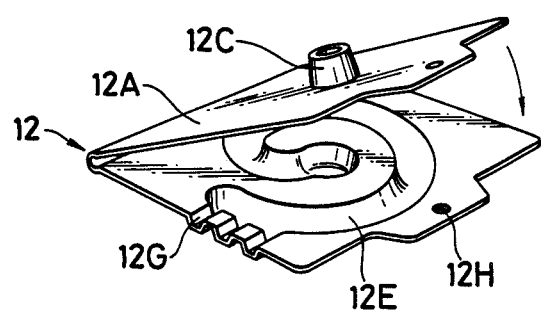

FIGS. 1 through 3 show an embodiment of the present invention wherein reference numeral 11 designates a reflector and numeral 12 designates a ventilation device having a dehumidifying function, the ventilating device 12 being arranged within the range of sufficient heat from a light source (a bulb) of the reflector 11.

The ventilation device 12 is formed of a very thin board-like member, substrate 12A, made of metal or resin. At the center of the substrate 12A, a groove 12B is formed which permits the substrate 12A to be bent. The substrate 12A is symmetrical with respect to the center groove 12B. At the center of the left hand half portion of the thin board-like substrate 12A as seen in the drawing, an air aperture 12C is provided with a groove 12D formed at the bottom of said air aperture 12C in which sealing material is to be coated. On the right hand half portion of said substrate 12A as seen in the drawing, there is formed a groove 12E for retaining desiccant 12F therein. The desiccant groove 12E is formed, for example, like a swirl, so that the passage formed thereby may have a sufficient length from the opposite side of the air aperture 12C to the port 12G located at the edge of the substrate 12A, namely, so that the inhaled air may contact with the desiccants 12F for as long as possible in groove 12E. The port 12G is formed to have several slits for adjusting the port dimension so as to permit adjusting of the amount of air per unit time which flows into the port 12G and which contacts with the desiccants 12F as well as to prevent falling out or dropping of the desiccants 12F into the interior of the lamp device through port 12G. Further, the substrate 12A is provided with mounting holes 12H which coincide with each other when substrate 12A is folded over on itself at the groove 12B and the two halves of the substrate 12A are closely contacted with each other. The substrate 12A is folded over about groove 12B and closely contacted with the aid of adhesive or soldering, for example, at the portion marked by the dot line 12L as shown in FIG. 2, whereby the area surrounding the desiccant groove 12E is completely sealed. In such a construction, the ventilating device 12 is coupled and fixed to the reflector 11 with a screw 12I in such a manner that the air aperture 12C is projected to the outside of the reflector 11, as shown in FIG. 1.

Further, as shown in FIG. 1, a rubber tube 12J is connected to the air aperture 12C for preventing the direct contact of water drops, dust, mud or the like to the air aperture 12C. The rubber tube 12J is preferably long and is provided with a partial different cross section so as to prevent a water membrane adhered to the distal tip portion of the tube from getting to the air aperture 12C when the air flows in. In addition, the rubber tube 12J is provided with a permeable plug 12K for preventing the isolation of the air passage due to a bend at an acute angle caused by an external force as well as for controlling the amount of the air per unit time which flows into the interior of the groove 12B of the ventilating device 12 and which contacts with the desiccants 12F.

In the above construction air communication or respiration exists along the route from the ports 12G of the ventilating device to the rubber tube 12J through the groove 12E for desiccants 12F and the air aperture 12C, whereby generation of internal pressure can be prevented at the time of flashing of the lamp device. In this case, sufficient dehumidifying is carried out with the effect of the desiccants 12F and the dehumidifying power lasts very long due to emittance of humidity from the desiccants 12F by the effect of heat from the light source.

Figure 4:
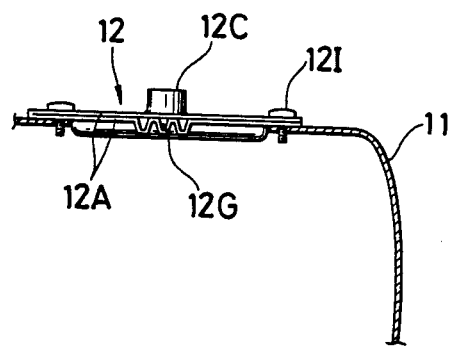
FIG. 4 is a sectional view showing another embodiment of a device according to the present invention.
Figure 5:
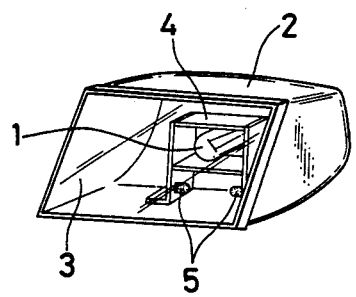
FIG. 5 is a perspective view showing an example of a prior art vehicle lamp device.

In the above described embodiment, the ventilating device 12 is mounted on the internal surface of the reflector 11. However, it is possible to mount the ventilating device 12 as shown in FIG. 4 (that is, through an aperture in the reflector 11). Although the port 12G according to the above embodiment is provided with several slits, any other form, for example, a mesh form may be used, so long as dropping of the desiccants 12F into the lamp device is prevented, and the amount of the air inside the lamp device which contacts with the desiccants 12F is controlled.

As described above, a vehicle lamp device according to the present invention is provided with a ventilating device which prevents generation of internal pressure in the lamp device, and which permits making a very thin lens and a reflector made of resin, whereby the resulting device is light in weight and whereby easy selectivity of adhesive can be made. Further, the ventilating device having the above described dehumidifying function assures a clear lens and reflector without cloudiness. Still further, the ventilating device is formed into a plain shape easy of receiving heat from the light source, and accordingly, it enables dehumidifying and emittance of humidity from the desiccants effectively, resulting in a long effective life. As another advantage, desiccants 12F are very easy to put into the plain groove 12E because insertion of desiccants is carried out before the halves of the thin board-like substrate 12A are contacted to each other, and the desiccants can thus have a great absorptive power. Still another advantage is that the ventilating device has a thin form and does not disturb the light distribution.

What is claimed is:

1. A vehicle lamp device, comprising:
    a reflector made of synthetic resin and which also serves as a housing for the lamp device;
    a lens mounted at a front surface of said housing;
    a light source arranged in said housing; and
    a ventilating device coupled to said housing for permitting air to pass in and out of said housing, said ventilating device comprising:
    a first substrate member having an aperture therein for providing air communication with the outside of the lamp device; and
    a second substrate member arranged closely adjacent to said first substrate member, said closely adjacent substrate members being located and mounted to said housing at a position within the range of receiving heat from said light source;
    at least one of said substrate members including means defining an air passageway, said air passageway having desiccants filled therein; and
    at least one of said substrate members having means defining a port for providing air communication between said air passageway filled with desiccants and the interior of the lamp device.

2. The vehicle lamp device of claim 1, wherein said substrate members are integrally connected together.

3. The vehicle lamp device of claim 2, comprising a flexible connecting portion integrally connecting said substrate members together to permit folding of one of said substrate members onto the other of said substrate members about said flexible connecting portion.

4. The vehicle lamp device of claim 1, wherein said substrate members are board-like substrate members which are closely contacted with each other.

5. The vehicle lamp device of claim 4, wherein said substrate members are integrally connected together.

6. The vehicle lamp device of claim 5, comprising a flexible connecting portion integrally connecting said substrate members together to permit folding of one of said substrate members onto the other of said substrate members about said flexible connecting portion.

7. The vehicle lamp device of claim 1, wherein said air passageway extends between said aperture of said first substrate member and said port.

8. The vehicle lamp device of claim 7, wherein said air passageway is curved.

9. The vehicle lamp device of claim 7, wherein said air passageway comprises a depression in said second substrate member, and is defined between said depression of said second substrate member and substantially flat portions of said first substrate member which extend over said depressed portions of said second substrate member when said substrate members are arranged closely adjacent to each other.

10. The vehicle lamp device of claim 8, wherein said first and second substrate members are contacted with each other over at least a portion of surfaces thereof.

11. The vehicle lamp device of claim 1, wherein said first and second substrate members are contacted with each other over at least a portion of surfaces thereof.

12. The vehicle lamp device of claim 1, wherein said air passageway is a spiral passageway extending between said aperture and said port.

13. The vehicle lamp device of claim 12, wherein said port is formed in said second substrate member.

14. The vehicle lamp device of claim 1, wherein said ventilating device is attached to the outside of said housing.

15. The vehicle lamp device of claim 1, wherein said ventilating device is attached to the interior of said housing.

* * * * *